Sept. 3, 1940. J. W. BROWN ET AL 2,213,544
MANUFACTURE OF CHEMICALLY PURE HYDROCHLORIC ACID
Filed April 16, 1937
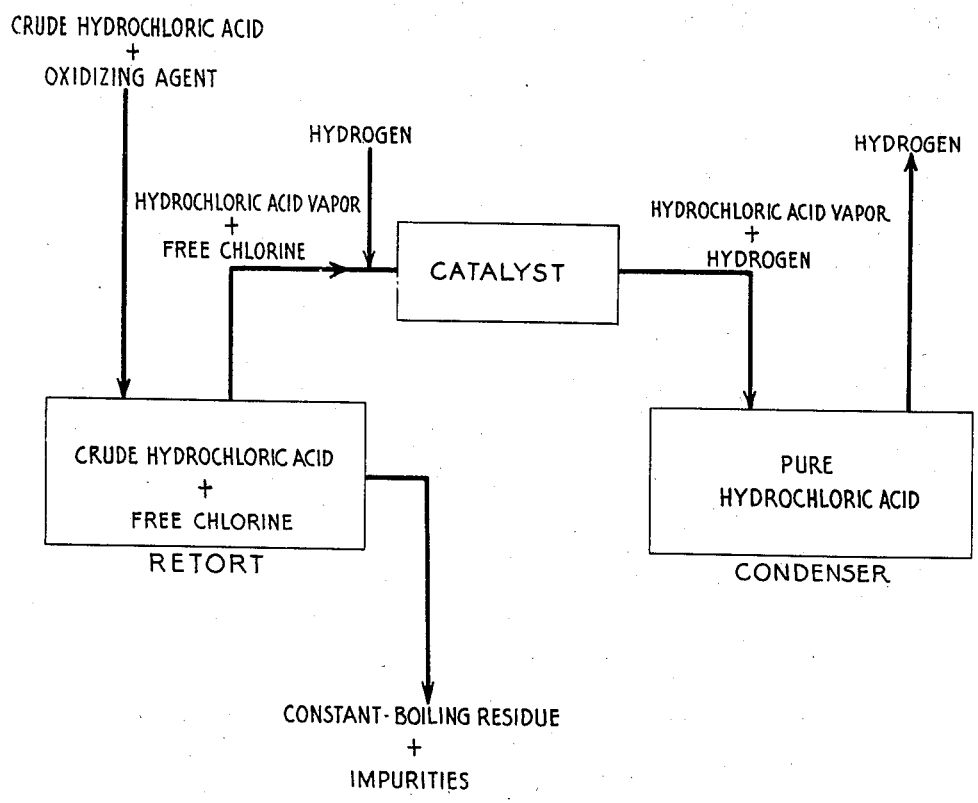
James W. Brown
Hallock C. Hosford   INVENTORS
BY *George T. Johannsen*
              ATTORNEY.

Patented Sept. 3, 1940

2,213,544

UNITED STATES PATENT OFFICE 2,213,544

MANUFACTURE OF CHEMICALLY PURE HYDROCHLORIC ACID

James W. Brown, Hammond, and Hallock C. Hosford, East Chicago, Ind., assignors to E. I. du Pont de Nemours & Company, Wilmington, Del., a corporation of Delaware Application April 16, 1937, Serial No. 137,288

5 Claims. (Cl. 23—154)

This invention relates to the manufacture of chemically pure hydrochloric acid and is particularly directed to processes for purifying crude hydrochloric acid wherein arsenical and organic impurities are removed by distillation in the presence of free chlorine and wherein the effluent vapor is treated with hydrogen in the presence of a catalyst to convert the excess free chlorine to hydrogen chloride.

In the production of hydrochloric acid, particularly by the well known processes involving the double decomposition of common salt (NaCl) and sulfuric acid, impurities are introduced into the evolved hydrogen chloride. A large portion of these impurities is removed during washing and filtering of the hydrogen chloride but the more volatile ones persist and are absorbed in water along with the hydrogen chloride in the absorbers.

For example, arsenic which is usually present in the sulfuric acid is converted into arsenous chloride which because of its low boiling point is particularly persistent. Similarly, easily volatilized organic compounds originally present in the salt as well as organic matter which has been converted to easily volatilized compounds by the action of the sulfuric acid are carried over and absorbed together with the hydrogen chloride.

These arsenical and organic impurities, for the same reasons that they persist in the crude acid, cannot be readily and economically separated by direct distillation of the crude acid.

The fact that these impurities are present in the crude acid in minor amounts only, as well as the fact that the tolerances for them in chemically pure acid is inordinately small, further augments the difficulty of their removal. For example, arsenic which rarely exceeds one part per million in the crude acid must be reduced to less than one tenth part per million to meet the requirements of the American Chemical Society for chemically pure acid. Similarly the tolerance for organic matter in chemically pure acid is very small because of the discoloration produced by small amounts of this impurity.

Altho it is known that arsenical and organic impurities may be removed from hydrochloric acid by distillation in the presence of an oxidizing agent, the process has the disadvantage that free chlorine, liberated by the action of the oxidizing agent on the hydrochloric acid, is carried over into the distillate. That this process has not been successfully adapted to commercial operation is due mainly to the difficulty of removing the excess free chlorine.

Many of the attempts to remove the chlorine have led to the introduction of additional impurities. For example, the use of acetylene or other unsaturated organic compounds has introduced chlorine derivatives. The acid is also frequently contaminated with the unsaturated compounds.

Other suggestions, such as fractional distillation, have proved suitable for small scale operations only. The intermittent character of this type of distillation makes it unsuitable for commercial operations. Furthermore the first fraction, that containing chlorine, is also the more concentrated one; thus the yield is materially impaired.

We have found that chemically pure hydrochloric acid can be made economically and effectively from crude acid, such as is obtained commercially from the decomposition of sulfuric acid and sodium chloride, by distilling in the presence of an oxidizing agent, more properly in the presence of an oxidizing agent, more properly in the presence of free chlorine which necessarily results from the presence of an oxidizing agent in hydrochloric acid, and treating the effluent vapor with hydrogen in the presence of a catalyst, to convert excess chlorine to hydrogen chloride.

By these processes we are able to produce chemically pure hydrochloric acid from crude acid in a manner consistent with commercial operations; we are able to do so effectively and economically and in a continuous manner; we are able to produce chemically pure acid in which the arsenic and organic contents are well below the specification for chemically pure acid; and, we are able to do so without introducing other impurities.

In the accompanying flow sheet, we have illustrated the essential steps of our process which consist briefly of treating the crude acid with an oxidizing agent, distilling the so-treated acid and treating the still vapor with hydrogen in the presence of a catalyst catalytically to convert excess free chlorine into hydrogen chloride.

Apparatus of any suitable design may be employed. Preferably, it should be designed for continuous distillation for reasons which will be pointed out later. Briefly, operation in this manner consists in effecting a continuous flow of acid thru the retort, crude acid being introduced and the constant boiling residue being withdrawn at rates which will give a distillate of desired concentration.

Distillation of the crude acid is effected in the presence of free chlorine in order to oxidize the arsenical impurities to less volatile forms which are retained in the still residue, and to convert organic impurities to non-volatile or non-condensible forms which are retained in the still residue or which escape to the atmosphere.

The chlorine may be introduced in several ways. It may be introduced as such, or it may be produced in the nascent state by adding an oxidizing agent to the acid. We have found that the addition of an oxidizing agent, particularly in aqueous solution, is more economical and convenient. As oxidizing agents for this purpose are well known, it is sufficient to mention that among those which we have found particularly satisfactory are the alkali metal chlorates and permanganates, and hydrogen peroxide.

The amount of oxidizing agent necessary to oxidize the impurities may be determined by gradually increasing the amount until free chlorine can be detected in the effluent vapors or in the residue. Once this amount is determined, it may be increased sufficiently to cover possible variations in the analysis of the crude acid and to provide an adequate margin for safe operation. Too much can only introduce more free chlorine whereas too little may result in imperfect elimination of the arsenic. A large excess should be avoided as it is unnecessary and would only have to be removed later.

More oxidizing agent is required for intermittent or batch-type distillation than for continuous distillation. Due to the fact that the free chlorine distills over with the first fraction, additional oxidizing agent must be added at intervals thruout the distillation to maintain oxidizing conditions. With continuous distillation, however, the oxidizing agent is continuously added with the crude acid so that oxidizing conditions are maintained without further additions. The latter process is particularly advantageous in that the excess of free chlorine is small.

The effluent vapor as it passes from the retort to the condenser is admixed with hydrogen and contacted with a heated catalyst to convert the excess free chlorine into hydrogen chloride. For this purpose we interpose a catalytic reaction chamber between the retort and the condenser.

This reaction chamber may be charged with any suitable catalyst capable of promoting the reaction between hydrogen and chlorine. Preferably we employ platinum catalysts such as platinum or platinum-rhodium gauze, or platinum black deposited upon a carrier. We are not limited to the use of platinum catalysts however for we have obtained satisfactory catalytic conversion with other materials. For example, a blank silica carrier (i. e., unplatinized) has proved entirely satisfactory.

Inasmuch as even traces of free chlorine cannot be tolerated in chemically pure hydrochloric acid and inasmuch as the concentration of free chlorine in the still vapor is small, it is essential that the catalytic mass be maintained at a temperature that will cause the reaction $$H_2 + Cl_2 \rightarrow 2HCl$$

to proceed substantially to completion. For this purpose the catalytic mass should be maintained at a temperature above about 500° C.

Acceptable results may be obtained at lower temperatures (i. e., 300° C. to 500° C.) but they are not uniformly reliable; the amount of free chlorine remaining in the distillate is too near the maximum limit to be considered satisfactory. (The maximum limit is that amount of free chlorine which, when the acid is treated with starch-iodide, shows the characteristic blue color on standing for ten or fifteen minutes but not before.) The lower temperatures are further objectionable because platinum catalysts are appreciably attacked by the still vapor.

Preferably the temperature of the catalytic mass should be maintained between about 650° C. and 1000° C., that is between a dark red and a bright cherry red heat. At this temperature the reaction between the hydrogen and the free chlorine is so complete that free chlorine can be detected in the distillate only with difficulty. Attack of platinum is also precluded. Higher temperatures may be employed but they are usually unnecessary. Furthermore, higher temperatures require increased condenser capacity.

The hydrogen may be introduced directly into the retort or it may be introduced into the vapor line as indicated in the flow sheet. It should be introduced far enough in advance of the reaction chamber to assure complete diffusion and uniform mixing with the still vapor. Prior to its introduction care should be taken to reduce the oxygen content of the system to a safe level. An excess of hydrogen is, of course, essential particularly as the concentration of the free chlorine in the still vapor is small. Maintaining a constant flow from the exit will ordinarily be sufficient. If desired the excess hydrogen may be recirculated.

In order more fully to illustrate the principle of our invention the following examples are given:

*Example 1*

In accordance with the procedure outlined above, a crude acid having the following average analysis:

Specific gravity_____degrees Baumé__  22.06
Hydrogen chloride_____per cent__  35.02
Arsenic_____parts per million__  0.14
Organic matter_____  High was continuously distilled at a rate to give a distillate of 23° Baumé. Simultaneously an aqueous solution of sodium chlorate ($NaClO_3$) was introduced at a rate such that one part by weight of sodium chlorate was added for each 1000 parts by weight of crude acid introduced. The effluent vapor admixed with hydrogen was then passed thru platinum gauze heated to a cherry red heat.

Two runs made with this setup gave distillates of the following analyses:

|  | Run 1 | Run 2 |
|---|---|---|
| Specific gravity_____degrees Baumé__ | 23.20 | 23.20 |
| Hydrogen chloride_____percent__ | 37.58 | 37.58 |
| Arsenic_____parts per million__ | 0.005 | 0.01 |
| Organic matter | None | None |
| Free chlorine | None | None |

The residue shows a distinct positive test for free chlorine, indicating the presence of free chlorine in the effluent vapor.

These data show that chemically pure acid can be produced by our processes which is not contaminated with free chlorine or organic matter and in which the content of arsenic is well below the tolerance for this impurity in chemically pure acid. It may be observed that the distillate, as tested by the standard alpha-naphthol test for organic matter, failed to show a positive test for organic matter.

*Example 2*

Following the procedure specified in Example 1 the effluent vapor admixed with hydrogen was contacted with a blank silica carrier heated to cherry red heat. Two runs made with this catalyst gave distillates of the following analyses:

|  | Run 1 | Run 2 |
| --- | --- | --- |
| Specific gravity_____degrees Baumé__ | 22.55 | 22.95 |
| Hydrogen chloride_____percent__ | 36.26 | 37.04 |
| Arsenic_____parts per million__ | 0.003 | 0.016 |
| Organic matter_____ | None | None |
| Free chlorine_____ | None | None |

These data show that results comparable with those of Example 1 may be obtained with other catalysts.

It is apparent that the crude acid, particularly that produced at plants having different sources of raw materials or at plants using different processes and apparatus, may vary considerably in the nature and amount of impurities. It is also apparent that crude acids of different concentrations may be produced. The concentrations specified are normal trade concentrations.

We claim:

1. The process for manufacturing hydrochloric acid which comprises distilling a crude aqueous solution of hydrochloric acid gas in the presence of traces of free chlorine whereby a mixture of water vapor and hydrochloric acid gas containing traces of chlorine is evolved, admixing hydrogen with the effluent vapor, contacting the mixture with a catalyst to convert the free chlorine contained in the effluent vapor to hydrogen chloride, and then cooling the effluent vapor sufficiently to condense the mixture of water vapor and hydrochloric acid gas.

2. The process for manufacturing hydrochloric acid which comprises distilling a crude aqueous solution of hydrochloric acid gas in the presence of traces of free chlorine whereby a mixture of water vapor and hydrochloric acid gas containing traces of chlorine is evolved, admixing hydrogen with the effluent vapor, contacting the mixture with a catalyst heated to above 500° C. to convert the free chlorine contained in the effluent vapor to hydrogen chloride, and then cooling the effluent vapor sufficiently to condense the mixture of water vapor and hydrochloric acid gas.

3. The process for manufacturing hydrochloric acid which comprises distilling a crude aqueous solution of hydrochloric acid gas in the presence of traces of free chlorine whereby a mixture of water vapor and hydrochloric acid gas containing traces of chlorine is evolved, admixing hydrogen with the effluent vapor, contacting the mixture with a platinum catalyst heated to above 500° C. to convert the free chlorine contained in the effluent vapor to hydrogen chloride, and then cooling the effluent vapor sufficiently to condense the mixture of water vapor and hydrochloric acid gas.

4. The process for manufacturing hydrochloric acid which comprises distilling a crude aqueous solution of hydrochloric acid gas in the presence of traces of free chlorine whereby a mixture of water vapor and hydrochloric acid gas containing traces of chlorine is evolved, admixing hydrogen with the effluent vapor, contacting the mixture with platinum gauze heated to above 500° C. to convert the free chlorine contained in the effluent vapor to hydrogen chloride, and then cooling the effluent vapor sufficiently to condense the mixture of water vapor and hydrochloric acid gas.

5. The process for manufacturing hydrochloric acid which comprises distilling a crude aqueous solution of hydrochloric acid gas in the presence of traces of free chlorine whereby a mixture of water vapor and hydrochloric acid gas containing traces of chlorine is evolved, admixing hydrogen with the effluent vapor, contacting the mixture with a blank silica carrier heated to above 500° C. to convert the free chlorine contained in the effluent vapor to hydrogen chloride, and then cooling the effluent vapor sufficiently to condense the mixture of water vapor and hydrochloric acid gas.

JAMES W. BROWN.
HALLOCK C. HOSFORD.

CERTIFICATE OF CORRECTION.

September 3, 1940.

Patent No. 2,213,544.

JAMES W. BROWN, ET AL.

It is hereby certified that error appears in the printed specification of the above numbered patent requiring correction as follows: Page 1, second column, lines 21 and 22, strike out the words and comma "more properly in the presence of an oxidizing agent,"; page 2, second column, line 43, for "cholride" read --chloride--; and that the said Letters Patent should be read with this correction therein that the same may conform to the record of the case in the Patent Office.

Signed and sealed this 29th day of October, A. D. 1940.

Henry Van Arsdale,
Acting Commissioner of Patents.

(Seal)